Feb. 24, 1959   F. M. HARTMAN, SR   2,874,492
DOZER ATTACHMENT FOR TRACTORS
Filed Jan. 25, 1957   2 Sheets-Sheet 1

INVENTOR.
FRANK M. HARTMAN, SR.
BY
McMorrow, Berman + Davidson
ATTORNEYS.

Feb. 24, 1959
F. M. HARTMAN, SR
2,874,492
DOZER ATTACHMENT FOR TRACTORS
Filed Jan. 25, 1957
2 Sheets-Sheet 2
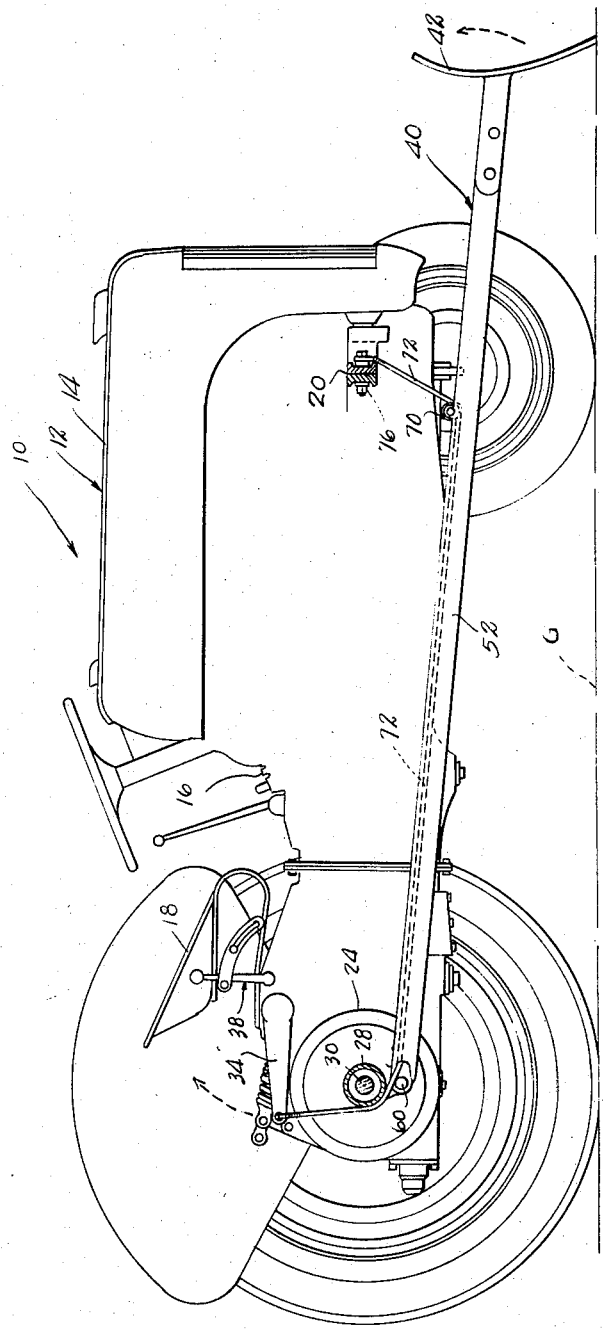
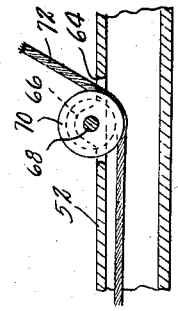
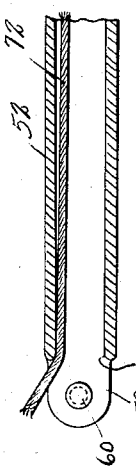
INVENTOR.
FRANK M. HARTMAN, SR.
BY
McMorrow, Berman & Davidson
ATTORNEYS.

United States Patent Office

2,874,492
Patented Feb. 24, 1959

2,874,492
DOZER ATTACHMENT FOR TRACTORS
Frank M. Hartman, Sr., Lima, Ohio
Application January 25, 1957, Serial No. 636,343
1 Claim. (Cl. 37—144)

This invention relates to an improved dozer attachment for tractors, which is vertically adjustable by operation of the power lift-arms of the tractors.

The primary object of the invention is to provide a simpler, more practical, and more easily installed and operated attachment of this kind, the attachment having thrust arms which are directly pivoted at their rear ends to the differential or rear axle housing of a tractor, and forward end portions of the thrust arms are flexibly suspended from the front axle of the tractor by cables which are connected to the power lift-arms of the tractor and serve also as means for elevating the dozer blade out of engagement with the ground.

Another object of the invention is to provide a dozer attachment of the character indicated which can be readily and economically manufactured, is easily installed, and is highly acceptable for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 2 is a side elevation view of Figure 1, partly in vertical longitudinal section, and with the rear side wheels of the tractor removed;

Figure 3 is an enlarged fragmentary vertical longitudinal section taken substantially on the plane of line 3—3 of Figure 1, and Figure 4 is an enlarged fragmentary vertical longitudinal section taken substantially on the plane of line 4—4 of Figure 1.

Figure 1:
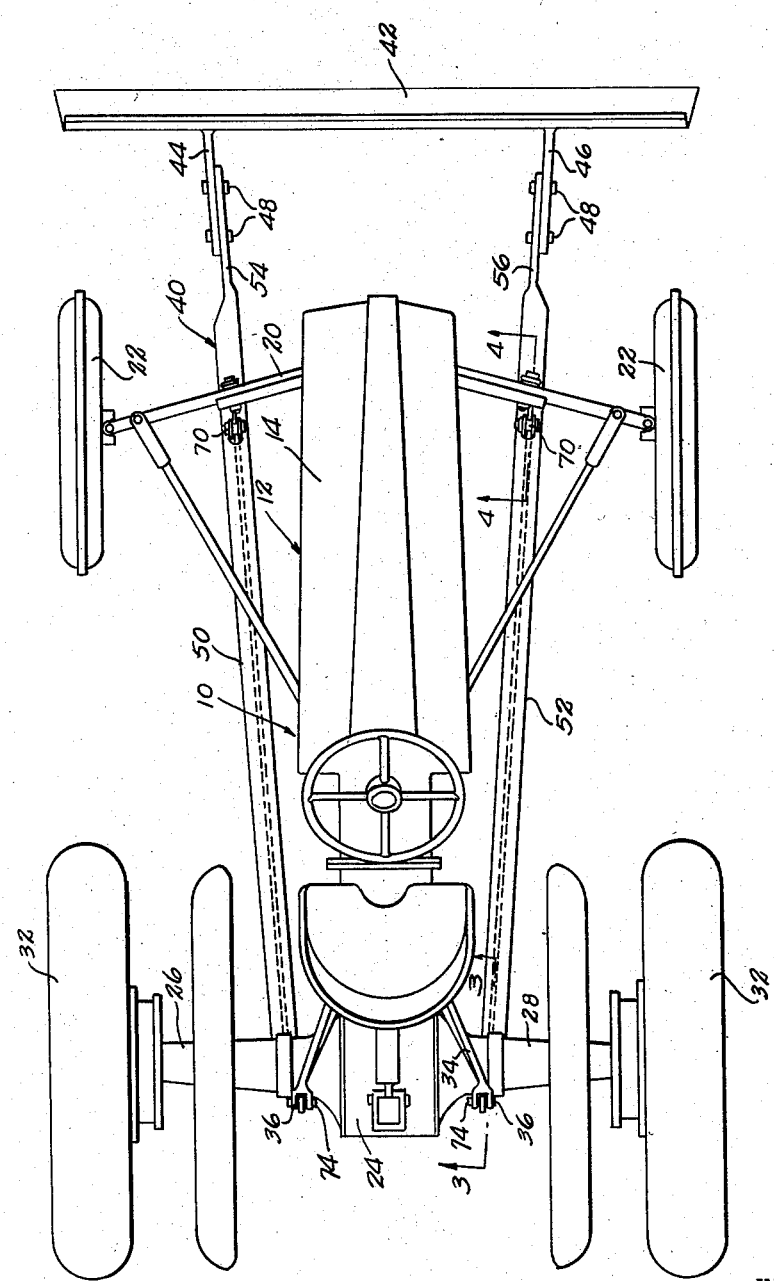
Figure 1 is a top plan view of a tractor having thereon a dozer attachment of the invention.

Referring to the drawings in detail, a conventional tractor is indicated generally at 10 having an elongated chassis 12 having mounted thereon a conventional power plant 14, a transmission 16, and an operator's seat 18. Extending transversely beneath the forward end of the chassis 12 is a front axle 20 having suitably secured thereon pivotal front steering wheels 22 at opposite ends thereof. Extending transversely of the rear end of the chassis 12 is a differential housing 24 having extending from opposite ends thereof axle housing members 26 and 28 which have therethrough drive axles 30, see Figure 2, on which are secured rear drive wheels 32. Mounted on and extending rearwardly from an upper rear part of the chassis 12 are horizontally pivoted power lift-arms 34, which terminate in bifurcated rear end portions 36. The power lift-arms are controlled by a suitable lever assembly, indicated generally at 38. The foregoing structure is conventional.

Indicated generally at 40 is a dozer attachment of the invention, which comprises a concave, transversely elongated dozer blade 42 of any suitable character, having fixed on its rear side a pair of rearwardly extending brackets 44 and 46. The brackets 44 and 46 are traversed by longitudinally spaced nut and bolt assemblies 48. The dozer attachment 40 includes a pair of elongated tubular, rearwardly converging thrust arms 50 and 52 which are similar, and have on their forward ends flattened portions 54 and 56 which are secured to the inner sides of the brackets 44 and 46 of the dozer blade 42 by the nut and bolt assemblies 48. On the rear ends of the thrust arms 50 and 52 are flat lugs 58, see Figure 3, which are secured to the underside of the differential housing 24 at the opposite ends thereof. The thrust arms 50 and 52 have open rear ends 62, and, as seen in Figure 4, the thrust arms 50 and 52 have openings 64 in the tops of their side walls. The arms 50 and 52 are located beneath the front axle 20 of the tractor 10, and the openings 64 are located slightly to the rear of the front axle 20, as shown in Figure 2. Ears 66 on the arms 50 and 52 at opposite sides of the openings 64 have extending therebetween shafts 68 on which are journaled pulleys 70, whose lower portions reach into the interiors of the arms 50 and 52.

Secured at their rear ends, as indicated at 76, to the lift-arms 34 and extending downwardly and around the undersides of related differential housing portions 26 and 28, and forwardly through the arms 50 and 52 and under the pulleys 70, are flexible cables 72. The cables 72 pass upwardly around the pulleys 70 and upwardly through the openings 64, and are secured at their front ends, as indicated at 76, to the front axle 20.

When the tractor power lift-arms 34 are elevated from the positions thereof shown in Figure 2, the cables 72 are tightened and straightened, so that the dozer blade 42 will be elevated relative to the ground G. The weight of the dozer attachment is sufficient to depress the same into engagement with the ground G when the lift-arms 34 are sufficiently depressed.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, fall within the scope of the appended claim.

What is claimed is:

In combination, a tractor having a chassis, a front axle on the front end of the chassis, a differential axle housing on the rear end of the chassis having housing portions at the opposite ends of the housing, and rearwardly extending power lift-arms on the chassis above the differential housing, a pair of elongated thrust arms having forward and rear ends, said thrust arms being positioned beneath said differential housing and beneath said front axle, with the forward ends of the thrust arms extending forwardly beyond said front axle, a dozer blade fixed on the forward ends of the thrust arms, said thrust arms being tubular and said rear ends being open, lugs on the rear ends of the thrust arms horizontally pivoted to the differential housing at the underside of the differential housing, intermediate portions of the side walls of the thrust arms having openings therein located rearwardly of said front axle, horizontal axis pulleys mounted on the arms in said openings and having lower portions reaching into the interiors of the arms, cables extending through said thrust arms, said cables having rear end portions extending rearwardly through the open rear ends of the arms, said rear end portions of the cables being trained under and around the rear sides of the housing portions of the differential housing and secured to the lift-arms, and said cables having forward end portions trained forwardly beneath said pulleys and extending upwardly through said openings and secured to said front axle.

References Cited in the file of this patent

UNITED STATES PATENTS

| | | |
|---|---|---|
| 1,837,108 | Buffington | Dec. 15, 1931 |
| 2,213,635 | Miller et al. | Sept. 3, 1940 |
| 2,589,104 | Lindeman | Mar. 11, 1952 |
| 2,629,944 | Arps | Mar. 3, 1953 |